United States Patent
Pick et al.

(10) Patent No.: US 6,826,200 B1
(45) Date of Patent: Nov. 30, 2004

(54) COMBINER/TMUX SIMULATED B1 TRANSPARENCY IN FIBER OPTIC NETWORKS RUNNING SONET

(75) Inventors: LeRoy Anthony Pick, Nepean (CA); Michael H. Diec, Kanata (CA); James R. Mattson, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 741 days.

(21) Appl. No.: 09/725,207

(22) Filed: Nov. 29, 2000

(51) Int. Cl.[7] .................................................. H04J 3/04
(52) U.S. Cl. ..................... 370/535; 370/242; 370/357; 370/430; 714/48
(58) Field of Search .............................. 370/357, 358, 370/366, 465, 503, 532, 535–544, 216, 242, 501, 509, 337; 714/47, 48, 49, 57

(56) References Cited

U.S. PATENT DOCUMENTS

| | | | | |
|---|---|---|---|---|
| 5,453,989 A | * | 9/1995 | Kitayama et al. ........... 370/241 |
| 5,832,036 A | * | 11/1998 | Nakamura ................... 375/211 |
| 5,841,760 A | * | 11/1998 | Martin et al. ................ 370/242 |
| 6,356,544 B1 | * | 3/2002 | O'Connor .................... 370/353 |
| 6,400,731 B1 | * | 6/2002 | Nitta ........................... 370/468 |
| 6,667,990 B1 | * | 12/2003 | Arao ........................... 370/465 |

* cited by examiner

Primary Examiner—John Pezzlo
Assistant Examiner—Alan V. Nguyen
(74) Attorney, Agent, or Firm—Dennis R. Haszko; Borden Ladner Gervais LLP

(57) ABSTRACT

The present invention overcomes the shortcomings of the prior art by providing a method of encoding bit error rates using a two-tiered system. If the bit error rate is less than a threshold value, the bit error rate is directly encoded in binary into substantially equal portions. However, if the error rate is equal to or greater than the threshold value, the error rate is encoded into equal valued amounts using a common step value. A remainder amount is also formulated to account for any remainders. Multiplying the equal valued amounts that are scaled by a common base value and then adding it all up along with the remainder amount results in a value which is at worst, within 0.2% of the original bit error rate value.

13 Claims, 2 Drawing Sheets

COMBINER/TMUX SIMULATED B1 TRANSPARENCY IN FIBER OPTIC NETWORKS RUNNING SONET

FIELD OF THE INVENTION

The present invention relates to transparent multiplexer/demultiplexers (TMUX) for use with a high speed connection between two points. More specifically, the invention relates to a method for encoding error counts for each tributary signal being transmitted through the TMUX.

BACKGROUND TO THE INVENTION

High speed links between two points have been in use in the communications industry for the past few years. The SONET standards ANSI T1.105 and Bellcore GR-253-CORE define the physical interface, optical line rates known as optical carrier signals, a frame format, and an operation, administration, maintenance, and provision ways protocol. These SONET standards can be used with a transparent multiplexer/demultiplexer (TMUX) at both ends of a high speed point-to-point link. By multiplexing a number of signals (each called a tributary or trib) at one end onto a single link and demultiplexing the resulting signal at the other end, an effective multiplexing of the link capacity can be achieved.

Ideally, such a TMUX needs to effectively provide full transparency for each trib. Such full transparency means that any errors in a trib at one end must survive the multiplexing/demultiplexing process. One approach detects B1 errors for each trib and if the error is greater than a specific number, generate an estimate of that error rate. This estimate is then encoded and transmitted through the TMUX to the other end. At this other end, the encoded estimate is extracted and decoded. The estimated error rate is then duplicated for this bit by readjusting the parity bits of the signal prior to transmission from the trib. Such estimation, under some circumstances depending on the base encoding method, may not be as accurate as desired.

Furthermore, if the transport of the encoded error rate is accomplished by using a single unused byte in the overhead generated for the TMUX, the loss of this byte may lead to faults.

From the above, there is therefore a need for an encoding scheme which may be used with a TMUX system. Such an encoding scheme must be accurate and, at least to some measure, fault tolerant of lost or dropped bytes.

SUMMARY OF THE INVENTION

The present invention overcomes the shortcomings of the prior art by providing a method of encoding bit error rates using a two-tiered system. If the bit error rate is less than a threshold value, the bit error rate is directly encoded in binary into substantially equal portions. However, if the error rate is equal to or greater than the threshold value, the error rate is encoded into equal valued amounts using a common step value. A remainder amount is also formulated to account for any remainders. Multiplying the equal valued amounts by a common base value and then adding it all up along with the remainder amount results in a value which is at worst, within 0.2% of the original bit error rate value.

For fault tolerance, instead of only using a single byte to encode the error rate, additional unused bytes may be used. This provides a level of fault tolerance in that if there are 10 unused bytes and a single byte is lost, 90% of the encoded data (the encoded error rate) is still accessible.

In a first aspect the present invention provides a method of preserving error counts for a plurality of tributary signals into a transparent multiplexer/demultiplexer (TMUX) said tributary signals being transparently transported over a high data rate span, the method comprising:
at a first end of said span:
a1) detecting a raw error count for each incoming tributary signal;
b1) encoding said raw error count into an encoded error count;
c1) inserting said encoded error count in specific unused bytes of successive TMUX messages for transport to a second end of said span;
at the second end:
a2) extracting said encoded error count from specific unused bytes of successively received TMUX messages transported from the first end;
b2) decoding said encoded error count into the raw error cont;
c2) adjusting portions of the tributary signal received from the first end such that said tributary signal has an error count substantially equal to said raw error count.

In a second aspect the present invention provides a method of encoding a raw error count of a tributary signal for use with a transparent multiplexer/demultiplexer said method comprising:
determining said error count
if said raw error count is less than a threshold value, encoding in binary said raw error count into one remainder portion and a number of equally valued portions such that a sum total of all the portions is equal to said raw error count;
if said raw error count is greater than said threshold value, encoding in binary said raw error count into one remainder portion and a number of equally valued non-remainder portions such that a sum of
all non-remainder portions multiplied
by a base value and
the remainder portion is substantially equal to the raw error count.

In a third aspect the present invention provides a method of encoding a raw error count of a tributary signal for use with a transparent multiplexer/demultiplexer, said method comprising:
determining said raw error count;
if said error count is less than a threshold value, encoding in binary said error count into a remainder portion and a number of equally valued portions such that a sum total of all the portions is equal to said raw error count;
if said error count is greater than the threshold value, encoding in binary said error count into one remainder portion and a number of equally valued non-remainder portions such that a sum of
all non-remainder portions multiplied by a base value; and
the remainder portion multiplied by the base value is substantially equal to the raw error count.

In a fourth aspect the present invention provides a method of encoding a raw error count of a tributary signal for use with a transparent multiplexed/demultiplexer, said method comprising:
determining said raw error count;
dividing said error count into a number of equally valued portions and a remainder portion
such that a specific condition is true, said condition being chosen from the group comprising:
a sum total of all the portions is equal to said error count;

a sum total of all the portions multiplied by a base value is substantially equal to said error count; and a sum total of the equally valued portions multiplied by the base value and added to the remainder portion is substantially equal to the error count.

BRIEF DESCRIPTION OF THE DRAWINGS

A better understanding of the invention may be obtained by reading the detailed description of the invention below, in conjunction with the following drawings, in which.

DESCRIPTION TO THE PREFERRED EMBODIMENT

The invention, as noted above, provides a method to encode an error rate and to deliver that encoded error rate from one end to the other of a high speed link.

To clarify, the high speed link is one through which different tribs (tributary signals) are multiplexed. The multiplexing is done at a transmission or source end of the link which receives the tribs from outside the high speed system. Once multiplexed, the tribs are transmitted to a reception end which demultiplexes the different tribs. Once demultiplexed, these tribs exit the high speed system and are distributed to their specific users. Users at both ends are not even aware of the existence of the high speed system—all they see and interact with is what they see as an interrupted communications link between their source end and a destination end. However, to properly gauge the performance of this communications link, users need to know its error rate. Thus, the error rate of a specific communication link (a single tributary signal out of the many feeding into the high speed system) must equal the error rate of the same communications link exiting the high speed system.

The present invention therefore encodes the error rate of a communications link or trib into multiple generally equally valued bytes. The coding scheme usually results in the first n bytes being equal, while the last 1 or 2 bytes serve as the remainder bytes which are different. Each of these bytes is transmitted through the high speed link from the transmission end to the reception end. Once received, the reception end reconstitutes the encoded error rate and adjusts the overhead for the specific trib signal for which the error rate applies. This adjustment is only to the extent that the error rate specifies—if the error rate is 500 bit errors per second, then 500 bits each second are adjusted in the overhead of the exiting signal. Thus, the trib signal for a specific communications link exiting the high speed system will have the same error rate as the entering trib signal for that communications link.

It should be noted that the SONET standard, for which this invention is ideally suited, defines a transport overhead for each SONET frame. The encoded error rate would be stored and transported in unused overhead bytes of this SONET frame.

Figure 1:
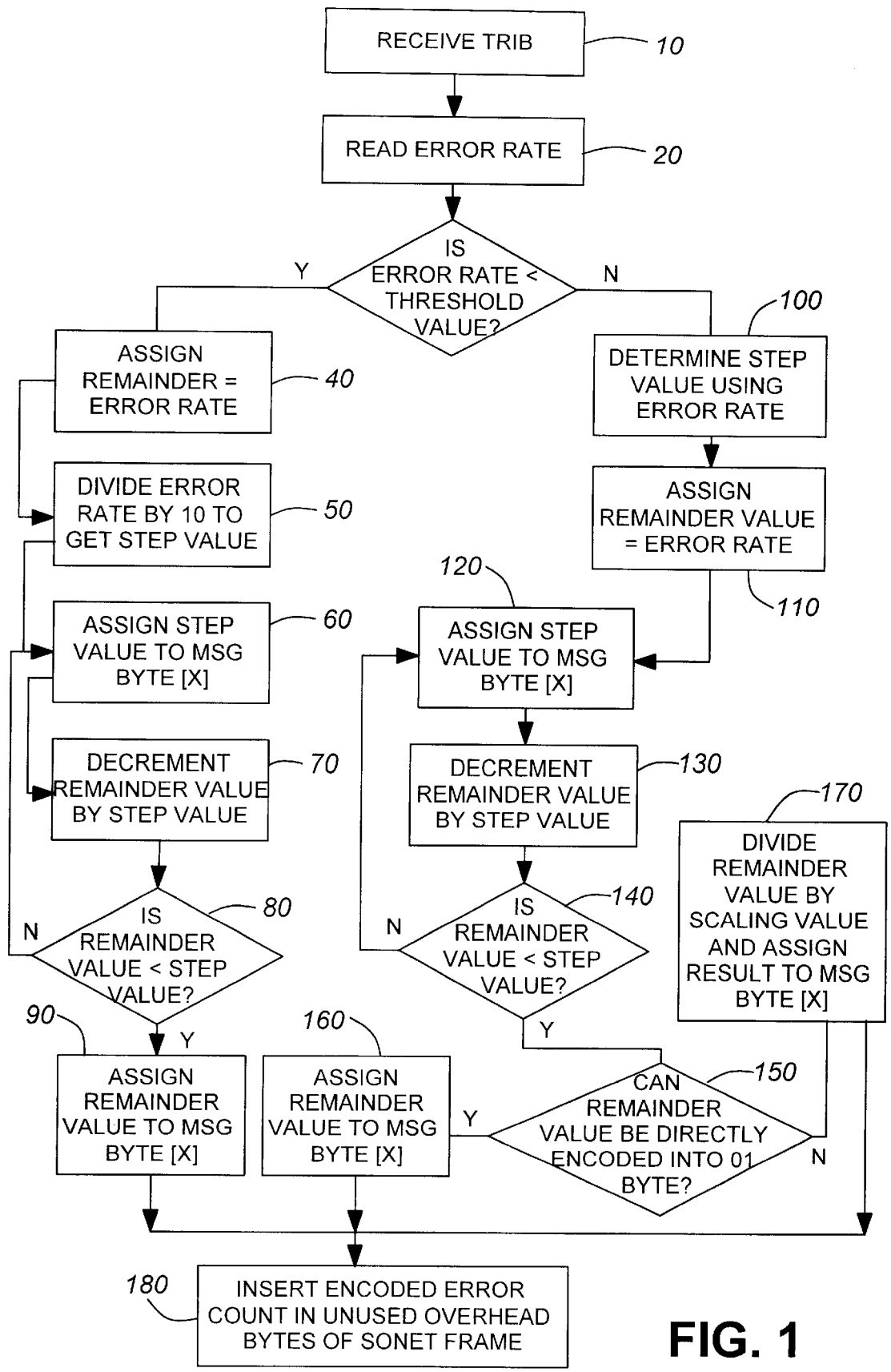
FIG. 1 is a flow chart detailing the steps in a method according to the invention.

Referring to FIG. 1, a flowchart of a method according to the invention is illustrated. As can be seen, the method begins (step 10) by receiving the tributary signal. Step 20 is reading the error rate of the trib using well-known means. Step 30 is deciding whether the error rate is less than a specified threshold value. If the error rate is below the threshold value, the error rate is assigned to a remainder variable (step 40). Step 50 is dividing the error rate by 10 to obtain the step value. The step value determines the increments by which the remainder value will be decreased for every step of the process.

Once the step value is obtained, a loop is entered. The step value is assigned to the message byte [x] where x is a counter (step 60). The message bytes [x] . . . [n] will contain the encoded error rate and will serve as the container or delivery which will bring the encoded error rate to the other end of the transmission link. Step 70 is that of decreasing or decrementing the remainder by the step value. Step 80 compares the current remainder value with the step value. If the remainder value is less than the step value, the loop terminates. If not, then steps 60, 70, and 80 are again executed in that order. Thus, all the message bytes which have their values assigned within the loop will all have the same value—the step value. It should be noted that the value of the counter x is incremented for every pass through the loop.

Once the loop is terminated, the counter is incremented one last time to prepare for writing to the last message byte in the process. Step 90 is that of assigning the remainder value to this last message byte.

At the reception end of the high speed system, once all the message bytes are received, they are all added together to obtain the error count.

Returning to step 30, if the error rate is more than the threshold value, then the method executes the branch starting with step 100.

Step 100 is that of determining the step value by using the error rate. This is generally done by dividing the error rate into equal portions that are rounded up to the nearest multiple of a fixed scaling value or factor. It would be advantageous if the scaling value or factor is a multiple of 8. This facilitates reproducing the bit error accurately at the downstream by adjusting 8 bit parity bytes. In the branch explained above (steps 40–90) the error rate was divided into 10 equal portions.

Once the step value is determined, step 110 is that of assigning the error rate to the remainder variable. As above, the remainder variable acts as the variable which will be decremented by the step value.

Steps 120–140 is a loop similar to the loop of steps 60–80. Step 120 is that of assigning the step value to a message byte [x] where x is a counter variable as explained above. Step 130 is that of decreasing the remainder value by the step value. Step 140 checks if the remainder value is less than the step value. If not, then the loop continues and step 170 is executed once again. As in the loop explained above, the counter x is incremented for each pass through the loop. Also as above, the counter is incremented once more often the loop terminates.

Once the condition set out in step 140 is finally met, step 150 is executed. This step is that of determining if the remainder value can be directly encoded into a single byte. If so, then the remainder value is not encoded and is stored directly in the next message byte (step 160). If not, then the remainder value is divided by the scaling value and the result is stored in the last message byte (step 170).

At this point, whether the method executes the step 40–90 branch or the step 100–160/170 branch, the result is a number of equally valued message bytes along with a final message byte containing either an encoded (divided by the scaling value) or unencoded remainder value.

To determine the results of the step 100–160/170 branch, the encoded message bytes are received at the reception end. Then each of the message bytes are handled according to how they are encoded. If a message byte is a direct storage of a specific value then it is not multiplied by the scaling value prior to a summation of the values in a group. If, on the other hand, a message byte is encoded as a scaled value, then the contents of the message byte are multiplied by the scaling value. Then, after each message byte has been handled according to how it encoded, the values from the message bytes, whether multiplied by the scaling value or not, are added together to result in the error rate.

Thus, if the step 40–90 branch is executed, at the reception end the error rate recovered is found by applying the formula $$\text{error rate} = \left[\sum_{x=1}^{n-1} tm[x]\right] + tm[n]$$

where tm[a] is the value of the $a^{th}$ message byte, and n is the number of message bytes used.

If the step 100–160/170 branch is executed, then at the reception end the encoded error rate is recovered by applying the formula $$\text{error rate} = \left[\sum_{x=1}^{n-1} (tm[x] \cdot \text{scaling value})\right] + tm[n]$$

if the remainder value is directly stored in the last message byte. Otherwise, the following formula is applied:

$$\text{error rate} = \left[\sum_{x=1}^{n} (tm[x] \cdot \text{scaling value})\right]$$

In the above formulas, as above, tm[a] is the value of the $a^{th}$ message byte and n is the number of message bytes used.

It is important to note that the number of message bytes used is a set number. A system designer sets this parameter by selecting the maximum number of message bytes that can be transmitted per unit time such as 10 message bytes per second. From this, the number of frames required can be determined—if 10 message bytes per second can be received, and each message byte is contained in one SONET frame, then 10 frames are needed to properly send the encoded error rate. In determining the number of message bytes which can be received, it should be noted that the message bytes should be evenly spaced in the time frame allotted (in this case a one second time frame) to allow the receiver time to read and ok/properly process each message byte.

Thus at the outset, if it has been determined that 10 message bytes can be received per unit time, then 10 SONET frames will be used to transport the encoded error rate for a particular system. Each separate trib would have its error rate transported using 10 SONET frames with one message byte in each of the 10 frames. As noted above, these message bytes would be stored in a single unused byte in the SONET frame.

Once the number of message bytes to be used is determined, the threshold value for the system can be found. Since a single byte having eight bits is to be used, then each message byte can have a maximum value of 126 with the last bit acting as a flag denoting a stored absolute value or a stored scaled value.

To explain the above, an 8 bit byte can have a maximum value of 255. For two bytes, a maximum value of 65535 (FF hex) is possible. However, in the SONET standard FF hex is an AIS (alarm indicator signal). If an entire frame is lost, a value of FF hex will be inserted in the requisite location. To avoid confusion with the AIS, the message byte value is limited to only a value of 126.

If we assume 10 message bytes are to be used (that is, 10 SONET frames will be used to transport the encoded error rate at one byte per frame), then the maximum error rate which may be directly stored and transmitted, without resorting to encoding, is 1260 (max value per byte)×10 (number of message bytes used)=1260.

Thus, the threshold value is 126. At error rates of 1260 and below, the error rate can be directly stored in the message bytes. However, if the error rate is greater than 1260 (1261 and higher) then one must resort to using encoding using a base value.

Regarding the scaling value, a judicious choice must be made. Since the encoded error rate is encoded using a binary system (base 2), experiments have shown that a scaling value of 56 (divisible by 8 which is a direct power of 2) yields the best results.

To signal the reception end whether a scaled value or a directly stored (absolute value) value, the MSB (most significant bit) acts as the flag denoting whether the value stored in the message byte is a scaled value or not. If the MSB is set (MSB=1) then the value stored in the message byte is an absolute value and the scaling value need not be used. However, if the MSB is not set (MSB=0) then the value stored in the message byte is scaled and the scaling value must be used. This is part of the reason why 126 is the maximum value that the message byte can have. If the MSB is set (MSB=1) and the message byte is allowed to have the value of 127, then a value of FF hex (80 hex +7f hex =FF hex) is possible. Thus, confusion and chaos can ensue.

Figure 2:
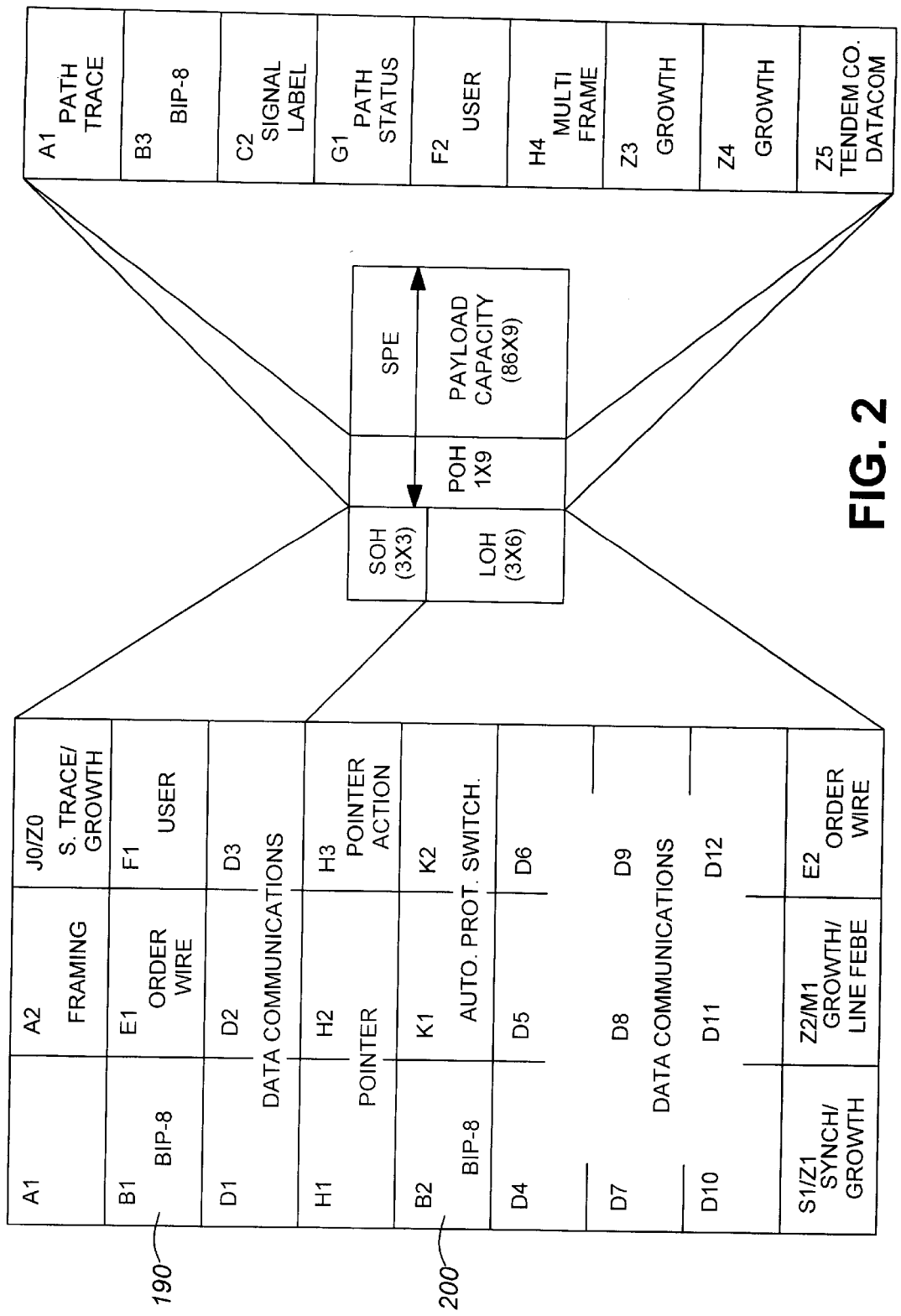
FIG. 2 details the fields in a typical SONET frame.

For the storage of the message bytes in the SONET frames, the system designer will have some choices. FIG. 2 illustrates the structure of a typical SONET frame. In this frame the bytes B1 (190) and B2 (200) are available for most SONET frames. Thus, depending on which byte the designer chooses, the message byte will be stored in an unused byte in the frame. Clearly, successive frames will contain the different message bytes. Thus, if using 10 bytes per second as our messaging rate, each message byte is transmitted in repeating frames for 1/10 of the available frames in the time period. It should be noted that successive SONET frames means successive frames for a particular trib. If the sequence of SONET frames received are as follows: A1, B1, B2, A2, A3, C1, C2, C3, A3, . . . then successive frames for the trib A will be frames A1, A2, A3 while successive frames for trib B are frames B1, B2 and so on. However, it should be noted that frame 1 of an STS-N (OC-N) signal typically has no unused bytes. Thus, frame 1 for an OC-H8 signal will have all bytes used. Succeeding frames (frames 2-N) of the signal will typically have most of the bytes in the frames unused. Thus, OC-1 implementations are not recommended if the message bytes are to be stored in the overhead bytes. Also, it should be clear that frames succeeding frame 1 (frames 2-N) would have unused bytes which can be used to carry the message bytes. It should however, be noted that the F1 "user" byte in an OC-1 signal may be used for a message byte if desired.

In a specific implementation, 10 message bytes are used along with a threshold value of 1261. With this implementation a maximum of 9 equal valued message bytes are used to encode the error count. A remainder portion is stored in the 10th message byte. These message bytes are stored in the K2 byte #9 out of each STS-12 in an STS-N signal. Thus, an OC-48 signal carrying four transparent OC-12 signals would steal K2 byte numbers 9, 21, 33, and 45 out of the line overhead to carry the message bytes with one per STS-12. To further clarify the invention, below is a printout of source code of a program which generates the values to be stored in successive message bytes.

```
/************************************************
* b1test.
*
* Prompts user for an error count, produces a list
of the byte values
* encoded using the enhanced b1 encoding scheme.
*/
#include <stdio.h>
#define SCALED_BOUNDARY (126 * 10)
main ()
{
    int bec_numbers [10]; /* bit error code numbers
*/
    int tmmsg_values [10];
    int uservalue, i;
    unsigned short int B1count, remainder, step_value,
accumulator;;
    for (;;)
    {
        printf ("Enter value: ");
        scanf ("%d", &uservalue);
        memset ( &bec_numbers, sizeof (bec_numbers),
0);
        memset ( &tmmsg_values, sizeof (tmmsg_values),
0);
        if ((uservalue < 0) ||
                (uservalue > ((1<<16) − 1)))
        {
            printf ("out of range\n\n");
            continue;
        }
        B1count = (unsigned short int) uservalue;
        if (B1count < SCALED_BOUNDARY)
        {
            step_value = (B1count / 10) + 1; /* +1
rounds up */
            remainder = B1count;
            for (i = 0; i < 9; i++)
            {
                tmmsg_values [i] = bec_numbers [i] =
step_value;
                remainder −= step_value;
                if (remainder < step_value)
                {
                    i++;
                    break;
                }
            }
            tmmsg_values [i] = bec_numbers [i] =
remainder;
        }
        else
        {
            step_value = ((B1count / (9 * 56)) + 1) *
56; /* +1 rounds up */
            if (step_value > ((6400 / 56) * 56))
                step_value = (6400 / 56) * 56;
            remainder = B1count;
            for (i = 0; i < 9; i++)
            {
                bec_numbers [i] = step_value;
                tmmsg_values [i] = step_value / 56;
                remainder −= step_value;
                printf ("remainder is %d\n", remainder);
                if (remainder < step_value)
                {
                    if (remainder < 127)
                    {
                        i++;
                        break;
                    }
                    printf ("old step value was %d\n",
step_value);
                    step_value = (remainder / 56) * 56;
                    printf ("new step value is %d\n",
step_value);
                }
            }
            if (remainder < 127)
            {
                tmmsg_values [i] = bec_numbers [i] =
remainder;
            }
            else
            {
                tmmsg_values [i] = remainder / 56;
                bec_numbers [i] = tmmsg_values [i] * 56;
            }
        }
        accumulator = 0;
        printf ("Error numbers to encode: ");
        for (i = 0; i < 10; i++)
        {
            accumulator += bec_numbers [i];
            printf ("%4d ", bec_numbers [i]);
        }
        printf ("\nEquvalent encoded TMMSG byte values:
");
        for (i = 0; i < 10; i++)
        {
            printf ("%02X ", tmmsg_values [i]);
        }
        printf ("\nResult number = %d, off by %d\n\n",
accumulator, B1count − accumulator);
    }
}
```

TABLE A

| Source Errors | B1 Count (prior art) | Delta | Accuracy | B1 Count (invention) | Delta | Accuracy |
|---|---|---|---|---|---|---|
| 1 | 1 | 0 | 100% | 1 | 0 | 100% |
| 126 | 126 | 0 | 100% | 126 | 0 | 100% |
| 176 | 127 | 49 | 72.20% | 176 | 0 | 100% |
| 1000 | 976 | 24 | 97.60% | 1000 | 0 | 100% |
| 6401 | 6240 | 161 | 97.40% | 6401 | 0 | 100% |
| 6769 | 6240 | 529 | 92.20% | 6769 | 0 | 100% |
| 10000 | 9760 | 240 | 97.60% | 10000 | 0 | 100% |
| 20000 | 19760 | 240 | 98.80% | 20000 | 0 | 100% |
| 40000 | 39760 | 240 | 99.40% | 40000 | 0 | 100% |
| 50000 | 49760 | 240 | 99.50% | 50000 | 0 | 100% |
| 57582 | 57200 | 382 | 99.30% | 57582 | 0 | 100% |
| 57623 | 57200 | 423 | 99.20% | 57568 | 55 | 99.90% |
| 60000 | 59760 | 240 | 99.60% | 59976 | 24 | 99.95% |
| 64000 | 63760 | 240 | 99.60% | 63856 | 144 | 99.80% |

Table A illustrates the shortcomings of the prior art and how the present invention overcomes these. As can be seen, the B1 count using the present invention has a 100% accuracy rate for error rates of up to 57582. The prior art's accuracy rate drops to 72% for an error rate of 127. While the prior art has accuracy rates of anywhere from 92.2% to 99.6% for error rates of between 1000 and 64000, the present invention's accuracy rate doesn't drop to 99.8% until error rates of 64000 are achieved.

A person understanding the above-described invention may now conceive of alternative designs, using the principles described herein. All such designs which fall within the scope of the claims appended hereto are considered to be part of the present invention.

We claim:

1. A method of preserving error counts for a plurality of tributary signals into a transparent multiplexer/demultiplexer (TMUX), said tributary signals being transparently transported over a high data rate span, the method comprising:

at a first end of said span;
- a1) detecting a raw error count for each incoming tributary signal;
- b1) encoding said raw error count into an encoded error count;
- c1) inserting said encoded error count in specific unused bytes of successive TMUX messages for transport to a second end of said span;

at the second end;
- a2) extracting said encoded error count from specific unused bytes of successively received TMUX messages transported from the first end;
- b2) decoding said encoded error count into the raw error count,
- c2) adjusting portions of the tributary signal received from the first end such that said tributary signal has an error count substantially equal to said raw error count;

wherein step c1 includes inserting said encoded error count across a maximum of 10 successive TMUX messages, said encoded error count occupying one byte in each of the TMUX messages, and wherein if said raw error count is less than 1261, step b1 is accomplished by encoding in binary said raw error count into one remainder portion and a maximum of 9 equally valued portions such that a sum total of all the portions is equal to said raw error count.

2. A method of preserving error counts for a plurality of tributary signals into a transparent multiplexer/demultiplexer (TMUX), said tributary signals being transparently transported over a high data rate span, the method comprising:

at a first end of said span;
- a1) detecting a raw error count for each incoming tributary signal;
- b1) encoding said raw error count into an encoded error count;
- c1) inserting said encoded error count in specific unused bytes of successive TMUX messages for transport to a second end of said span;

at the second end;
- a2) extracting said encoded error count from specific unused bytes of successively received TMUX messages transported from the first end;
- b2) decoding said encoded error count into the raw error count;
- c2) adjusting portions of the tributary signal received from the first end such that said tributary signal has an error count substantially equal to said raw error count;

wherein step c1 includes inserting said encoded error count across a maximum of 10 successive TMUX messages, said encoded error count occupying one byte in each of the TMUX messages, and wherein if said raw error count is greater that 1260, step b1 is accomplished by encoding in binary said raw error count into one remainder portion and a maximum of 9 non-remainder portions such that a sum of:
- all non-remainder portions multiplied by a scaling factor; and
- the remainder portion is substantially equal to the raw error count.

3. A method as in claim 1 wherein each portion of the encoded error count occupies one byte in a TMUX message.

4. A method as in claim 2 wherein each portion of the encoded error count occupies one byte in a TMUX message.

5. A method as in claim 2 wherein said scaling factor is 56.

6. A method of encoding a raw error count of a tributary signal for use with a transparent multiplexer/demultiplexer said method comprising:

determining said raw error count;

if said raw error count is less than a threshold value, encoding in binary said raw error count into one remainder portion and a number of equally valued portions such that a sum total of all the portions is equal to said raw error count;

if said raw error count is greater than said threshold value, encoding in binary said raw error count into one remainder portion and a number of equally valued non-remainder portions such that a sum of:
- all non-remainder portions multiplied by a scaling factor; and
- the remainder portion is substantially equal to the raw error count.

7. A method as in claim 6 wherein said threshold value is 1261 and said scaling factor is 56.

8. A method of encoding a raw error count of a tributary signal for use with a transparent multiplexer/demultiplexer, said method comprising:

determining said raw error count;

if said error count is less than a threshold value, encoding in binary said error count into a remainder portion and a number of equally valued portions such that a sum total of all the portions is equal to said raw error count;

if said error count is greater than the threshold value, encoding in binary said error count into one remainder portion and a number of equally valued non-remainder portions such that a sum of all non-remainder portions multiplied by a base value; and the remainder portion multiplied by the base value is substantially equal to the raw error count.

9. A method as in claim 8 wherein said threshold value is 1261 and said scaling factor is 56.

10. A method of encoding a raw error count of a tributary signal for use with a transparent multiplexer/demultiplexer, said method comprising:

dividing said raw error count into a number of equally valued portions; and a remainder portion such that a specific condition is true, said condition being chosen from the group comprising:

a sum total of all the portions is equal to said raw error count;

a sum total of all the portions multiplied by a base value is substantially equal to said raw error count; and a sum total of the equally valued portions multiplied by the base value and added to the remainder portion is substantially equal to the raw error count.

11. A method of preserving error counts for a plurality of tributary signals into a transparent multiplexer/demultiplexer (TMUX), said tributary signals being transparently transported over a high data rate span, the method comprising:

at a first end of said span;
- a1) detecting a raw error count for each incoming tributary signal;
- b1) encoding said raw error count into an encoded error count;
- c1) inserting said encoded error count in specific unused bytes of successive TMUX messages for transport to a second end of said span;

at the second end;
- a2) extracting said encoded error count from specific unused bytes of successively received TMUX messages transported from the first end;
- b2) decoding said encoded error count into the raw error count;
- c2) adjusting portions of the tributary signal received from the first end such that said tributary signal has an error count substantially equal to said raw error count;

wherein step c1 includes inserting said encoded error count across a maximum of 10 successive TMUX messages, said encoded error count occupying one byte in each of the TMUX messages, and wherein step b1 is accomplished by encoding a raw error count of a tributary signal for use with a transparent multiplexer/demultiplexer, said method comprising:

dividing said raw error count into a number of equally valued portions and a remainder portion wherein a specific condition is true, said condition being chosen from the group comprising:

a sum total of all the portions is equal to said raw error count;

a sum total of all the portions multiplied by a base value is substantially equal to said raw error count; and a sum total of the equally valued portions multiplied by the base value and added to the remainder portion is substantially equal to the raw error count.

12. A method of preserving error counts for a plurality of tributary signals into a transparent multiplexer/demultiplexer (TMUX), said tributary signals being transparently transported over a high data rate span, the method comprising at a first end of said span;
- a1) detecting a raw error count for each incoming tributary signal;
- b1) encoding said raw error count into an encoded error count;
- c1) inserting said encoded error count in specific unused bytes of successive TMUX messages for transport to a second end of said span;

at the second end;
- a2) extracting said encoded error count from specific unused bytes of successively received TMUX messages transported from the first end;
- b2) decoding said encoded error count into the raw error count;
- c2) adjusting portions of the tributary signal received from the first end such that said tributary signal has an error count substantially equal to said raw error count;

wherein step c1 includes inserting said encoded error count across a maximum of 10 successive TMUX messages, said encoded error count occupying one byte in each of the TMUX messages, and wherein step b1 is accomplished by encoding a raw error count of a tributary signal for use with a transparent multiplexer/demultiplexer, said method comprising:

if said raw error count is less than a threshold value, encoding in binary said raw error count into a remainder portion and a number of equally valued portions such that a sum total of all the portions is equal to said raw error count;

if said raw error count is greater than the threshold value, encoding in binary said raw error count into one remainder portion and a number of equally valued non-remainder portions such that a sum of:

all non-remainder portions multiplied by a base value; and the remainder portion multiplied by the base value is substantially equal to the raw error count.

13. A method of preserving error counts for a plurality of tributary signals into a transparent multiplexer/demultiplexer (TMUX), said tributary signals being transparently transported over a high data rate span, the method comprising:

at a first end of said span;
- a1) detecting a raw error count for each incoming tributary signal;
- b1) encoding said raw error count into an encoded error count;
- c1) inserting said encoded error count in specific unused bytes of successive TMUX messages for transport to a second end of said span;

at the second end;
- a2) extracting said encoded error count from specific unused bytes of successively received TMUX messages transported from the first end;
- b2) decoding said encoded error count into the raw error count;
- c2) adjusting portions of the tributary signal received from the first end such that said tributary signal has an error count substantially equal to said raw error count;

wherein step c1 includes inserting said encoded error count across a maximum of 10 successive TMUX messages, said encoded error count occupying one byte in each of the TMUX messages, and wherein step b1 is accomplished by encoding a raw error count of a tributary signal for use with a transparent multiplexer/demultiplexer said method comprising:

if said raw error count is less than a threshold value, encoding in binary said raw error count into one remainder portion and a number equally valued portions such that a sum total of all the portions is equal to said raw error count;

if said raw error count is greater than the threshold value, encoding in binary said raw error count into one remainder portion and a number of equally valued non-remainder portions such that a sum of:

all non-remainder portions multiplied by a base value; and the remainder portion is substantially equal to the raw error count.

* * * * *